US011855913B2

(12) United States Patent
McDonald et al.

(10) Patent No.: US 11,855,913 B2
(45) Date of Patent: Dec. 26, 2023

(54) HIERARCHICAL SWITCHING DEVICE WITH DEADLOCKABLE STORAGE AND STORAGE PARTITIONS

(71) Applicant: Hewlett Packard Enterprise Development LP, Houston, TX (US)

(72) Inventors: Nicholas G. McDonald, Fort Collins, CO (US); Darel N. Emmot, Wellington, CO (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 707 days.

(21) Appl. No.: 16/177,172

(22) Filed: Oct. 31, 2018

(65) Prior Publication Data

US 2020/0136995 A1 Apr. 30, 2020

(51) Int. Cl.
*H04L 12/937* (2013.01)
*H04L 49/253* (2022.01)
(Continued)

(52) U.S. Cl.
CPC ........ *H04L 49/254* (2013.01); *H04L 43/0805* (2013.01); *H04L 45/74* (2013.01);
(Continued)

(58) Field of Classification Search
CPC ... H04L 43/0805; H04L 45/74; H04L 49/101; H04L 49/254; H04L 49/351; H04L 49/356; H04L 49/90
See application file for complete search history.

(56) References Cited

U.S. PATENT DOCUMENTS 5,214,640 A 5/1993 Sakurai et al.
6,324,613 B1 11/2001 Aguilar et al.
(Continued)

FOREIGN PATENT DOCUMENTS

EP 0206512 A2 12/1986
EP 0849917 B1 7/2005
(Continued)

OTHER PUBLICATIONS

Koka, P. et al., "Silicon-Photonic Network Architectures for Scalable, Power-Efficient Multi-Chip Systems," (Research Paper), Jun. 19-23, 2010, pp. 117-128, http://dl.acm.org/citation.cfm?id=1815977.

(Continued)

*Primary Examiner* — Jason E Mattis
*Assistant Examiner* — Bao G Nguyen
(74) *Attorney, Agent, or Firm* — Yao Legal Services, Inc.

(57) ABSTRACT

An example hierarchical switching device may include sub-switches that form a fully interconnected all-to-all network, wherein the sub-switches comprise external output ports, internal input ports and internal output ports to exchange packets with other sub-switches within the fully interconnected all-to-all network. The switching device may further include a deadlockable storage, a storage partition and a switch controller. The deadlockable storage space is exclusively assigned to an internal input port of the internal input ports of the sub-switch including the deadlockable storage. The storage partition is exclusively assigned to an external output port of the external output ports and exclusively assigned to the internal input port. The switch controller is to route a packet destined for an external output port of a sub-switch through the internal input port of the sub-switch to the deadlockable storage or if the packet (Continued)

corresponds to the external output port, to the storage partition.

20 Claims, 4 Drawing Sheets

(51) Int. Cl.
*H04L 49/101* (2022.01)
*H04L 49/90* (2022.01)
*H04L 43/0805* (2022.01)
*H04L 49/351* (2022.01)
*H04L 45/74* (2022.01)
*H04L 49/356* (2022.01)

(52) U.S. Cl.
CPC .......... *H04L 49/101* (2013.01); *H04L 49/351* (2013.01); *H04L 49/356* (2013.01); *H04L 49/90* (2013.01)

(56) References Cited

U.S. PATENT DOCUMENTS

| | | | |
|---|---|---|---|
| 7,020,131 B1 | 3/2006 | Yun et al. | |
| 7,039,011 B1 | 5/2006 | Badt, Jr. | |
| 7,668,979 B1* | 2/2010 | Wentzlaff | G06F 9/30076 |
| | | | 710/33 |
| 8,228,930 B1* | 7/2012 | Kim | H04L 49/25 |
| | | | 370/413 |
| 8,352,669 B2 | 1/2013 | Wu et al. | |
| 9,065,773 B2 | 6/2015 | Aybay | |
| 9,100,323 B1 | 8/2015 | Sindhu et al. | |
| 9,231,891 B2 | 1/2016 | Thakkar et al. | |
| 9,693,124 B2 | 6/2017 | Robinson et al. | |
| 9,699,078 B1 | 7/2017 | Chen et al. | |
| 2004/0081184 A1* | 4/2004 | Magill | H04L 49/3018 |
| | | | 370/413 |
| 2006/0126610 A1 | 6/2006 | Ryan et al. | |
| 2006/0171381 A1* | 8/2006 | Benner | H04Q 3/5455 |
| | | | 370/386 |
| 2006/0285548 A1 | 12/2006 | Hill et al. | |
| 2007/0145828 A1 | 6/2007 | Taylor et al. | |
| 2008/0279195 A1 | 11/2008 | Okuno | |
| 2011/0167158 A1 | 7/2011 | Lehr et al. | |
| 2011/0310739 A1* | 12/2011 | Aybay | H04L 49/505 |
| | | | 370/235 |
| 2012/0106560 A1* | 5/2012 | Gumaste | H04L 45/50 |
| | | | 370/401 |
| 2012/0134359 A1 | 5/2012 | Nakagawa | |
| 2012/0140626 A1 | 6/2012 | Anand et al. | |
| 2013/0058331 A1 | 3/2013 | Thakkar et al. | |
| 2017/0187616 A1* | 6/2017 | Chen | H04L 12/46 |
| 2017/0214579 A1* | 7/2017 | Chen | H04L 41/12 |
| 2017/0337010 A1* | 11/2017 | Kriss | H04L 49/9036 |
| 2020/0136995 A1* | 4/2020 | McDonald | H04L 43/0805 |

FOREIGN PATENT DOCUMENTS

| | | |
|---|---|---|
| JP | 07-282018 A | 10/1995 |
| JP | 2817770 B2 | 10/1998 |

OTHER PUBLICATIONS

International Search Report and Written Opinion received for PCT Patent Application No. PCT/US2019/028122, dated Aug. 7, 2019, 11 pages.

International Search Report and Written Opinion received for PCT Application No. PCT/US2019/059160, dated Mar. 27, 2020, 09 pages.

* cited by examiner

HIERARCHICAL SWITCHING DEVICE WITH DEADLOCKABLE STORAGE AND STORAGE PARTITIONS

BACKGROUND

Network switching devices are sometimes implemented as interconnected sub-networks that connect the external input and output ports of these network switching devices. Such network switching devices, such as routers or switches, may exhibit external port-to-port dependencies that may generate deadlocks. External port-to-port dependencies may determine success of the packet received via a particular external input port and desiring to exit the network switching device on a particular external output port that is not permanently dependent on the success of another packet received via a different external input port and exiting through a different external output port of the same network switching device. High radix switching device may be difficult to implement since on-chip requirements may grow with a polynomial factor.

A network switching device may be implemented as a hierarchical switching device to reduce the size needed for implementation. However, such inner hierarchical topologies may present external port-to-port dependencies. Although hierarchical switching devices can be over provisioned to remove all port-to-port dependencies, such over provisioning may waste bandwidth within the switching device. Alternatively, a hierarchical switching device may allow port-to-port dependencies and implement a routing algorithm that provides enough virtual channels to remain deadlock free. However, this may result in the waste of resources as well.

Figure 1:
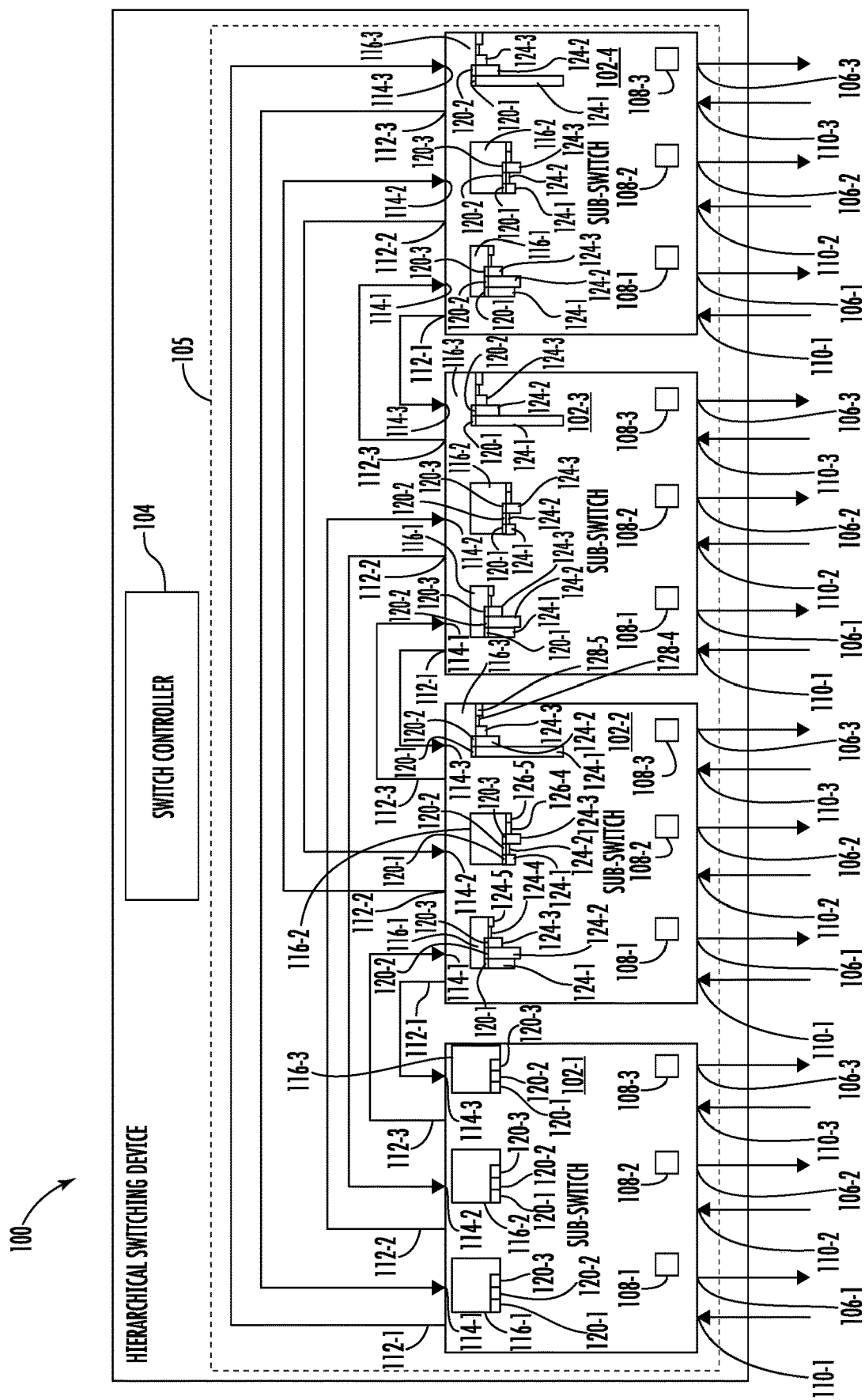
FIG. 1 is a diagram schematically illustrating portions of an example hierarchical switching device.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Disclosed herein are example hierarchical switching devices, hierarchical switching device methods and switch controllers for a hierarchical switching device that reduce port-to-port dependencies without the over provisioning of bandwidth in the hierarchical switching device. The example hierarchical switching devices, hierarchical switching device methods and switch controllers for a hierarchical switching device may yield high performance and efficient use of storage capacity with less complexity.

As used herein, a switching device may refer to devices that determine direction a data packet is to take in a network. Examples of switching devices may be routers or switches. The hierarchical switching device may refer to switching device formed by a plurality of interconnected sub-switches. As used herein, a fully interconnected all-to-all network in which all nodes are connected to each other. For example, a fully interconnected all-to-all network may be a one dimensional hyperX network or a one-dimensional flattened butterfly network. As used herein, a sub-switch may refer to switching devices that participate with other switching devices within a logical composite arrangement such that the plurality of sub-switches behaves as a single switching device.

A hierarchical switching device may comprise a switch controller to receive a packet at a first sub-switch of the plurality of output queued sub-switches, for example at an external input port of the first sub-switch. The external input port may be a port to receive packets from devices external to the switching device. The receive packet may be routed to a second sub-switch of the plurality of sub-switches, for example to a particular external output port of the second sub-switch. The external output port may be a port to send packets to other devices external to the switching devices. The switch controller, in response to receiving the packet, may route the packet directly from the first sub-switch to the second sub-switch. In some examples, the packet may be directly routed between the first sub-switch and the second sub-switch via a minimal path. As used herein, the minimal or direct path may refer to the path in the fully interconnected network that directly interconnects the first sub-switch and the second sub-switch. Thus, routing the packet via a minimal path avoids a packet passing through any intermediate or intervening sub-switch.

In some implementations, the switch controller may be located within the hierarchical switching device may receive and route all of the packets received at the switching device. In other implementations, each sub-switch may comprise a respective switch controller that is to route packets received at the corresponding sub-switch.

As used herein, the switch controller may represent a combination of hardware and software logic in a switching device for routing packets through the internal subnetwork of the switching device from the external input ports and receive the packets to the destination external output ports to which the packets are to be routed. In some examples, one single switch controller may implement the hardware and software logic routing packets through the internal subnetwork while in some other implementations, each sub-switch forming the internal subnetwork may comprise a switch controller implementing the hardware and software logic that form the functionalities for routing packets.

As used herein, a storage partition may refer to a portion of the physical buffer associated to the corresponding port that may be dynamically or statically assigned by the switch controller. For example, the switch controller may store dynamic pointers to different storage partitions of the buffers of each input port of the switching device that may change during operation. In other implementations, switch controller may store static pointers to different storage partitions or a combination of static pointers to particular storage conditions and dynamic pointers to other storage partitions with the same buffer of a particular input port.

The disclosed hierarchical switching devices, hierarchical switching device methods and switch controllers for a hierarchical switching device utilize a fully connected all-to-all network of sub-switches. In one implementation, each sub-switch is connected to each of the other sub-switches via a single internal output port and a single internal input port.

Each internal input port is connected to each of the external output ports of the sub-switch by at least a cross-bar or equivalents thereof and storage areas. Each internal input port is allocated a deadlockable storage and storage partitions within storage.

The deadlockable storage queues packets received at an internal input port of a sub-switch independent of which of the external output ports of the sub-switch the packet received at the internal input port is destined. The deadlockable storage facilitates more efficient use of storage capacity on the hierarchical switching device. At the same time, the storage partitions reduce the occurrence of deadlocks by providing packet storage set aside for queuing packets destined to the corresponding external output port of the sub-switch.

The storage partitions provide storage space for those packets destined for a particular external output port that arrive at a particular internal input port when the generally shared deadlockable storage space allocated to the particular internal input port is completely occupied by other queued packets and no longer has available capacity. In some implementations, packets may be stored or queued in the storage partitions prior to complete consumption of the deadlockable storage space. The storage partitions may be sized based upon characteristics of the network to reduce the likelihood that a particular internal input port may become unavailable for receiving packets for prolonged periods of time. In other words, the storage partition may be sized such that after the storage partition has been filled, by the time that yet another packet arrives at the same internal input port and destined for the same external output port, the storage partition will have been emptied of its packet or packets and can become available if needed.

The storage partitions facilitate multiple sub-switch hops within the switching device with a reduced likelihood for deadlocks. For example, in some scenarios, a packet received at a first sub-switch may be destined for an external output port of a second sub-switch. However, the internal input port of the second sub-switch that is directly connected to the first sub-switch may not have associated available storage space (the deadlockable storage space associated with the internal input port of the second sub-switch and the storage partition associated with the internal input port and the external output port of the second sub-switch may be fully occupied). In such a scenario, the first sub-switch may alternatively forward the packet to an internal input port of a third intervening sub-switch, wherein the packet is forwarded through an internal output port of the third intervening sub-switch to a second internal input port of the second sub-switch having available storage space for queuing the packet as it awaits transmission through the external output port of the second sub-switch.

The storage partitions have an overall size across all sub-switches (I*O*M) that is a product of the sum of external and internal inputs(I), the sum of external and internal output(O) and the size of the largest packet allowed (M). The deadlockable storage has an overall size across all sub-switches (I*L) that is a product of the sum of external and internal inputs (I) and the sum of the number of packets received at a maximum anticipated rate (L). As L is typically much larger than M, the sum I*O*M+I*L is much less than I*O*L*O which would otherwise be required to be performant. In addition, the internal bandwidth ($BW_{int}$) equivalent to twice the external bandwidth ($BM_{int}>=2*BW_{ext}$) is sufficient to be performant over general traffic patterns in contrast to hierarchical switches having S sub-switches that only communicate directly and which require an internal bandwidth $BW_{int}>=S*BW_{ext}$ to be performant over general traffic patterns.

Disclosed herein is an example hierarchical switching device. The example hierarchical switching device may include sub-switches that form a fully interconnected all-to-all network, wherein the sub-switches comprise external output ports, internal input ports and internal output ports to exchange packets with other sub-switches within the fully interconnected all-to-all network. The switching device may further include a deadlockable storage, a storage partition and a switch controller. The deadlockable storage space is exclusively assigned to an internal input port of the internal input ports of the sub-switch including the deadlockable storage. The storage partition is exclusively assigned to an external output port of the external output ports and exclusively assigned to the internal input port. The switch controller is to route a packet destined for an external output port of a sub-switch through the internal input port of the sub-switch to the deadlockable storage or if the packet corresponds to the external output port, to the storage partition. In one implementation, the switch controller routes the packet received at the internal input port to the storage partition corresponding to the external output port in response to the deadlockable storage being full and the storage partition being available.

Disclosed herein is an example hierarchical switching device method. The method may comprise determining availability of a deadlockable storage exclusively assigned to an internal input port of first a sub-switch associated with an external output port for which a packet received at a second sub-switch is destined. In response to the deadlockable storage being available, the packet is routed to the deadlockable storage. In response to the deadlockable storage not being available, availability of a storage partition, exclusively assigned to receive packets through the internal input port and to transmit packets through the external output port, is determined. In response to the storage partition being available, the packet is routed to the storage partition.

Disclosed herein is an example switch controller for a hierarchical switching device. The switch controller may comprise a non-transitory computer-readable medium that contains instructions for direction of a processor. The instructions may comprise deadlockable storage availability determination instructions, deadlockable storage routings instructions, storage partition availability determination instructions and partition storage routing instructions. The deadlockable storage availability determination instructions direct the processor to determine availability of a deadlockable storage exclusively assigned to an internal input port of first a sub-switch associated with an external output port for which a packet received at a second sub-switch is destined. The deadlockable storage routing instructions direct the processor to route the packet to the deadlockable storage in response to the deadlockable storage being available. The storage partition availability determination instructions are triggered in response to the deadlockable storage not being available. The storage partition availability determination instructions direct the processor to determine availability of a storage partition exclusively assigned to receive packets through the internal input port and to transmit packets through the external output port. The partition storage routing instructions direct the processor to route the packet to the storage partition in response to the storage partition being available.

FIG. 1 is a block diagram schematically illustrating portions of an example hierarchical switching device 100. Switching device 100 reduces the occurrence of deadlocks or port-to-port dependencies without the over provisioning of bandwidth in the hierarchical switching device. Switching device 100 comprises sub-switches having deadlockable storage and storage partitions for each sub-switch internal input port to provide high performance and efficient use of storage capacity with less complexity. Switching device 100 comprises a plurality of sub-switches 102-1, 102-2, 102-3 and 102-4 (collectively referred to as sub-switches 102) and a switch controller 104.

Sub-switches 102 are interconnected to one another to form an all-to-all network, wherein each sub-switch is directly connected to the each other sub-switches of switching device 100. In the example illustrated, each sub-switch has a single connection to each of the other sub-switches, avoiding the over provision of bandwidth. In other implementations, each sub-switch may be connected to each of the other sub-switches through multiple connections. In the example illustrated, switching device 100 is illustrated as having four sub-switches. In other implementations, switching device 100 may comprise a greater number of switches or a fewer number of switches. For example, in some implementations, switching device 100 may comprise 16 sub-switches.

Each of sub-switches 102 comprises external output ports 106-1, 106-2, 106-3 (collectively referred to as external output port 106), external output storages 108-1, 108-2, 108-3 (collectively referred to as external output storages 108), external input ports 110-1, 110-2, 110-3 (collectively referred to as ports 110), internal output ports 112-1, 112-2, 112-3 (collectively referred to as ports 112), internal input ports 114-1, 114-2 and 114-3 (collectively referred to as ports 114), and deadlockable storages 116-1, 116-2 and 116-3 (shown in broken lines as the example illustrates these deadlockable storage spaces as having been consumed or completely filled) (collectively referred to as storages 116). External output ports 106 comprise ports that are connected to an external network (not shown in the figure) to send packets to external devices. Each of external output ports 106 may have a corresponding external output storage 108. In the example illustrated, of a port 106-1, 106-2 and 106-three are associated with external output storages 108-1, 108-2 and 108-3, respectively which store packets awaiting output through their respective output ports 106.

External input ports 110 comprise ports through which packets are received. Although not illustrated, each of external input ports 110 may also include an associated input port storage for queuing packets awaiting forwarding within the sub-switch 102.

Internal output ports 112 comprises ports through which packets are transmitted from a sub-switch to a different sub-switch of device 100. Internal input ports 114 comprise ports through which packets are received by the sub-switch from other sub-switches of device 100. In the example illustrated, internal output port 112-1 of sub-switch 102-1 is directly connected to internal input port 114-3 sub-switch 102-4. Internal output port 112-2 of sub-switch 102-1 is directly connected to internal input port 114-2 of sub-switch 102-3. Internal output port 112-3 of sub-switch 102-1 is directly connected to internal input port 114-1 of sub-switch 102-2. Internal output port 112-1 of sub-switch 102-2 is directly connected to internal input port 114-3 sub-switch 102-1. Internal output port 112-2 of sub-switch 102-2 is directly connected to internal input port 114-2 of sub-switch 102-4. Internal output port 112-3 of sub-switch 102-2 is directly connected to internal input port 114-1 of sub-switch 102-3. Internal output port 112-1 of sub-switch 102-3 is directly connected to internal input port 114-3 of sub-switch 102-2. Internal output port 112-2 of sub-switch 102-3 is directly connected to internal input port 114-2 of sub-switch 102-1. Internal output port 112-3 of sub-switch 102-3 is directly connected to internal input port 114-1 of sub-switch 102-4. Internal output port 112-1 of sub-switch 102-4 is directly connected to internal input port 114-3 of sub-switch 102-3. Internal output port 112-2 of sub-switch 102-4 is directly connected to internal input port 114-2 of sub-switch 102-2. Internal output port 112-3 of sub-switch 102-4 is directly connected to internal input port 114-1 of sub-switch 102-1. For purposes of this disclosure, the recitations that an internal output port of a first sub-switch is "directly" connected to an internal input port of second sub-switch means that there are no intervening sub-switches between the internal output port in the internal input port; such a "direct" connection does not preclude other non-sub-switch componentry between the internal output port in the internal input port.

Each of the internal input ports 114 is associated with or is allocated (by switch controller 104) a deadlockable storage 116 for storing packets received through the particular input port 114. In the illustrated drawings, the deadlockable storage spaces is schematically represented by the empty block, with the area of the empty block representing the total available unused space. In the example illustrated, deadlockable storage 116-3 associated with input port 114-3 of sub-switch 102-2 is shown at the particular example moment in time being illustrated, as being completely consumed in that it is completely filled with packets awaiting forwarding from the input port 114-3.

Each deadlockable storage 116 may be used for storing packets destined for any of external output ports 108 of the respective sub-switch or for any of the other internal output ports 114 of the particular sub-switch. The deadlockable storage 116 of each input port 114 is shared amongst all of the output ports of the particular sub-switch. Although such an architecture promotes efficient use of available storage space, such shared use of storage space may render the storage space susceptible to deadlock, storage space is not available upon the full consumption of the deadlockable storage. In one implementation, each deadlockable storage 116 has a size sufficiently large to contain a number of packets received at a maximum anticipated rate of transmission of packets to a particular sub-switch for a period of time extending from when the packet is sent by the sub-switch 102 to when a credit for the transmitted packet is received by the sub-switch 102.

To reduce the potential for such deadlocks, each input port 112 is assigned or is allocated (by switch controller 104) storage partitions 120, with each of the storage partitions 120 being dedicated to or reserved for to a particular one of external output ports 108. The storage partition 120 dedicated to a particular external output port 106 stores only those packets destined for the particular output port 108. In the example illustrated, each of the input ports 114 of each of the sub-switches 102 is associated with a set of storage partitions 120-1, 120-2 and 120-3, wherein storage partitions 120-1, 120-2 and 120-3 are reserved for external output ports 108-1, 108-2 and 108-3, respectively. As should be appreciated, each of the input ports 114 may have a greater or fewer number of such associated storage partitions 120 depending upon the number of external output ports provided by each sub-switch 102.

In the examples illustrated, the bars 124 schematically represent portions of the deadlockable storage 116 that are currently consumed or filled by packets being queued; they are not distinct storage region separate from deadlockable storage 116. Storage partitions 120 are also part of the same physical storage device or cluster of devices providing each of the respective deadlockable storages 116. The identity of those portions of deadlockable storage 116 that are consumed and storage partitions 120 dedicated to external output ports 106 is a function of accounting and linked list structures stored as data within the elements along with the packet data itself.

Each storage partition 120 may be sized based upon characteristics of the network in which switching device 100 forms a part to reduce the likelihood that a particular internal input port 112 may become unavailable for receiving packets for prolonged periods of time. In other words, each storage partition 120 may be sized such that after the storage partition has been filled, by the time that yet another packet arrives at the same internal input port 112 and destined for the same external output port 106, the storage partition will have been emptied of its packet or packets and a new empty storage partition for the particular external output port 106 has been made available for the particular internal input port 112. In one implementation, each storage partition 120 may have a size corresponding to the maximum size of a packet for which switching device 100 may accommodate.

In the example illustrated, the storage partitions 120 have an overall size across all sub-switches 102 (I*O*M) that is a product of the sum of external and internal inputs (I), the sum of external and internal output(O) and the size of the largest packet allowed (M). The deadlockable storage 116 has an overall size across all sub-switches 102 (I*L) that is a product of the sum of external and internal inputs (I) and the sum of the number of packets received at a maximum anticipated rate (L). As L is typically much larger than M, the sum I*O*M+I*L is much less than I*O*L*O which would otherwise be required to be performant. In addition, the internal bandwidth (BWint) equivalent to twice the external bandwidth (BMint>=2*BWext) is sufficient to be performant over general traffic patterns in contrast to hierarchical switches having S sub-switches that only communicate directly and which require an internal bandwidth BWint>=S*BWext to be performant over general traffic patterns.

Switch controller 104 may control the routing of packets through switching device 100. In some implementations, switch controller 104 may store topology of the network to which the hierarchical switching device 100 is connected. In some implementations, the switch controller 104 may determine the minimal or direct route for a packet using a pre-existing routing table stored in the switching device that stores the inner topology of the hierarchical switching device or by performing arithmetic operations, for example using a fixed function logic in the switching device. The routing table may also store the topology of the network to which the switching device connected to the switch controller is able to identify the external output port to be taken by the packet in order to be routed to its destination. Such a routing table may be periodically updated by a network controller in communication with the switching device. The network controller may also provide the topology of the network to which the switching device is connected. In some implementations, a first routing table storing the inner topology of the hierarchical switching device may be provided while a second routing table storing the topology of the network to which switching device is connected may be provided. The switch controller may first determine the external output port of the switching device through which the packet is to be routed by checking the routing table that stores the topology of the network. Based upon the external input port through which the packet has been received and the external output port to which the packet is to be routed, the switch controller 104 may determine the minimal route through the inner all-to-all network of sub-switches by consulting the routing table that stores the inner topology of the hierarchical switching device.

In some implementations, the switch controller 104 may monitor a state of the various storage spaces, the deadlockable storage and the storage partitions. For example, switch controller 104 may monitor the number of credits transferred between different sub-switches. Based on such monitoring, switch controller 104 may arbitrate which packet from which storage space is to be routed between the different sub-switches. In some implementations, the switching device may comprise a packet scheduler that distributes packets received in a particular input port of a particular sub-switch among the storage spaces of the different sub-switches to which the internal output ports of the particular sub-switch has access.

Upon receiving a packet at an external input port of the first sub-switch, switch controller 104 may determine the routing of the packet through device 100. In determining the route for the packet through device 100, the switch controller 104 determines, using a routing table, the particular external output port of device 100 and its associated second sub-switch, to which the packet should exit device 100 along the routing path. Once the particular external output port and associated second sub-switch have been identified by switch controller 104, switch controller 104 determines whether the deadlockable storage 116 of the particular internal input port of the second sub-switch that is directly connected to the first sub-switch has availability. If the particular deadlockable storage is available, there is space for the packet, switch controller 104 routes the packet to the particular deadlockable storage. If there is not sufficient space, switch controller 104 then determines the availability of a storage partition assigned to the particular input port of the second sub-switch that is directly connected to the first sub-switch and that is assigned to the external output port of the second sub-switch to which the packet is destined. If the particular storage partition is available, switch controller 104 routes the packet to the particular storage partition.

If the particular storage partition is not available, switch controller 104 evaluates alternative routing paths to the particular external output port through device 100. For example, switch controller 104 determines whether the packet may be routed to the second sub-switch to other intervening sub-switches of switching device 100, using a multiple sub-switch hop as described in the example below with respect to FIG. 2.

Because the storage partitions 120 reserve storage space at each input port for each of the external output ports, forward progress through the fabric is enhanced, reducing the chance of deadlock. Because each storage partition reserved is dedicated to a particular external output port 106, the chances of a deadlock for a packet destined to a first external output port occurring as a result of a large influx of packets directed to a different external output port or directed to one internal output port consuming a substantial portion or all of the available deadlockable storage space is reduced. Absent such storage partitions, the mix of outputs consumed indiscriminately can lead to deadlock, typically in a cyclic chain of dependencies through a fabric, where a first population cannot advance because of a lack of resources at its next hop, which propagates backwards to a previous population that also cannot advance, continuing until returning to the beginning. The storage partitions are dedicated to external outputs such that algorithms implemented at the level between switches arrange for such cyclic dependencies to not exist—there is always an escape at some point to an endpoint that removes packets from the fabric. Where deadlockable storage is allowed to be filled by packets destined for any external output, storage partitions are limited to one. When packets associated with that external output advance, it returns the occupied space to the occupied storage partition, even if that isn't where the space was taken from originally. The high level algorithm implemented by switch controller 104 thus allows packets to be removed from the fabric and forward progress continues. Eventually whatever resource conflict that lead to deadlockable storage to be deadlocked will be resolved and deadlockable storage will be freed and normal operation will resume.

New storage space may become available once packets are released from or flow from the previously filled deadlockable storage. In one implementation, any new storage space that is created or becomes available as a result of packets flowing from the previously filled deadlockable storage is first allocated to storage partition space and then allocated to the general shared pool of storage space provided by the deadlockable storage. For example, during the flow of packets to a particular input port, packets may fill the associated deadlockable storage 116. Should another packet destined for a particular external output port 106 arrive at the particular input port and should space be available in the storage partition reserved for the particular external output port 106, the packet destined for the particular external output port 106 may be stored in the storage partition. Thereafter, should a packet be released or flow from the previously filled deadlockable storage, space will be created/become available in the buffer. In response to the storage partition still being filled with the previous packet, the switch controller 104 will reestablish an empty storage partition for the particular external output port 106 by allocating the newly available space to a storage partition for the particular external output port 106. In other words, the establishment of empty available storage partitions reserved for each of the external output ports 106 takes priority over the making of available space in the deadlockable storage 116 when new spaces freed up in the buffer as a result of a packet leaving the filled the deadlockable storage.

Various example states of the various deadlockable storage 116 and storage partitions are shown with respect to sub-switches 102-2, 102-3 and 102-4. For purposes of illustration, the deadlockable storages 116 and storage partitions 120 of sub-switch 102-1 are all illustrated as being empty, devoid of packets. In the hypothetical state of switching device 100 shown in FIG. 1, each of the input ports 114-1 is illustrated as having a deadlockable storage that is partially consumed by packets 124-1 destined for external output port storage 108-1 and ultimately external output port 106-1, packets 124-2 destined for external output port storage 108-2 and ultimately external output port 106-2, packets 124-3 destined for external output port storage 108-3 and ultimately external output port 106-3. The deadlockable storage storages are further illustrated as being consumed by packets destined for the internal output ports. For example, deadlockable storage 116-1 of sub-switch 102-2 is partially consumed by packets 124-4 destined for internal output port 112-2 and packets 124-5 destined for internal output port 112-3. Deadlockable storage 116-2 of sub-switch 102-2 is illustrated in an example state where deadlockable storage 116-2 is partially consumed by packets 126-4 destined for internal output port 112-1 of sub-switch 102-2 and packets 126-5 destined for internal output port 112-3 of sub-switch 102-2. Lastly, deadlockable storage 116-3 (illustrated by broken lines) is illustrated as being completely consumed by packets 124-1, 124-2 and 124-3 destined for external output ports 106-1, 106-2 and 106-3, respectively, of sub-switch 102-2 and by packets 128-3 destined for internal output port 112-1 of sub-switch 102-2 and packets 128-5 destined for internal output port 112-2 of sub-switch 102-2. The storage partitions 120-1 and 120-2 associated with internal input port 114-3 and reserved for external output ports 106-1 and 106-2 of sub-switch 102-2 are illustrated as being empty or as having available storage space for receiving incoming packets. The storage partition 120-3 associated with internal input port 114-3 and reserved for external output port 106-3 is illustrated as also being consumed or filled by a packet or multiple packets, indicated by the box or bar that would otherwise represent storage partition 120-3 no longer being present or shown. Similar methods are used in FIG. 1 to illustrate an example states for the deadlockable storage and storage partitions of sub-switches 102-3 and 102-4. Although similar states are shown for storage spaces (deadlockable storages and storage partitions) for the internal input ports of sub-switches 102-3 and 102-4, it should be appreciated that in actuality, each of the storage spaces may have completely different states with respect to one another at any given moment.

Figure 2:
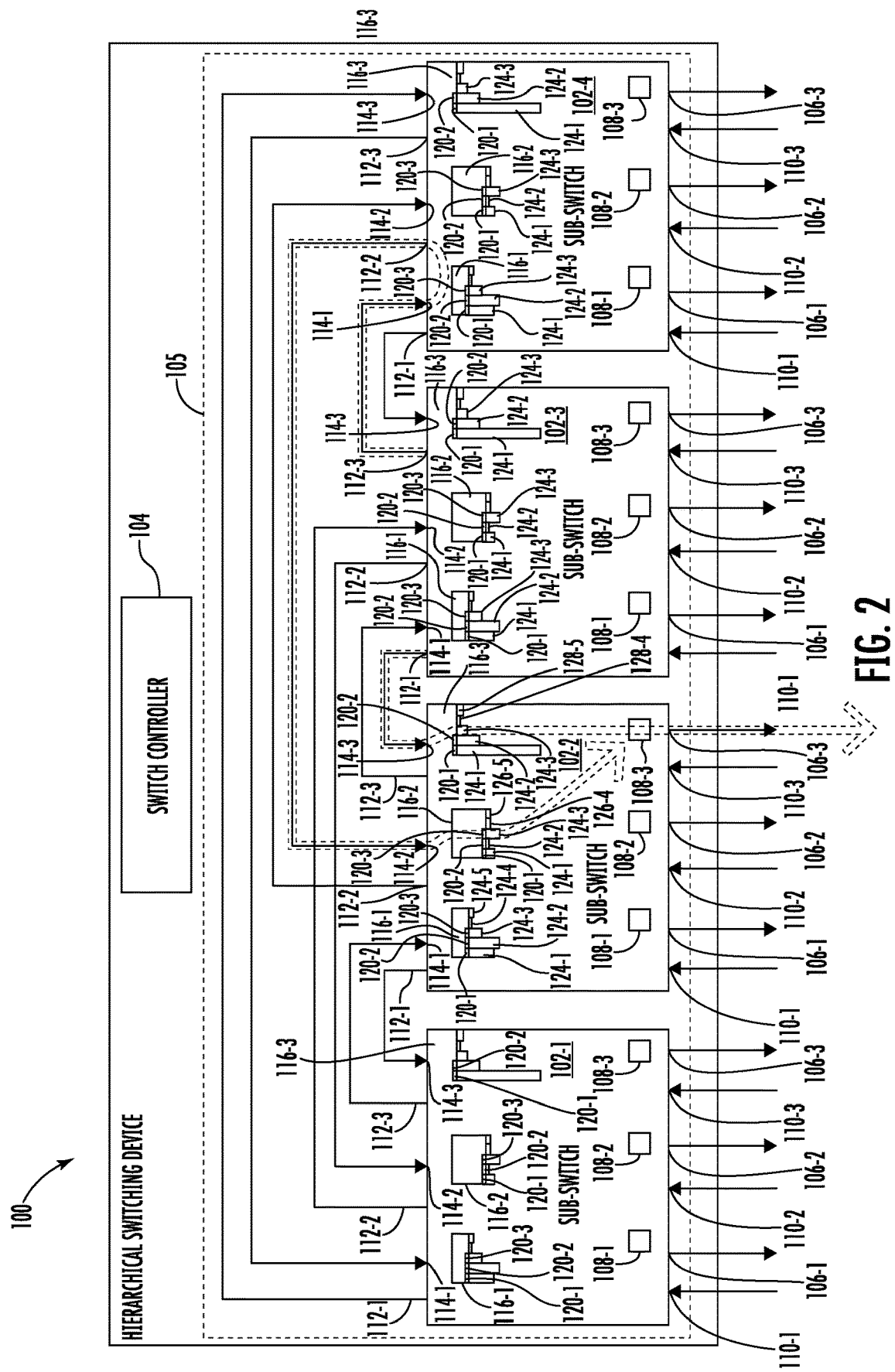
FIG. 2 is a diagram schematically illustrating the example hierarchical switching device of FIG. 1 during an example multi-sub-switch packet routing hop.

The storage partitions facilitate multiple sub-switch hops within the switching device with a reduced likelihood for deadlocks. FIG. 2 illustrates an example scenario in which a packet received at sub-switch 102-3 may be destined for an external output port 106-3 of sub-switch 102-2. However, as shown in the example scenario, the internal input port 114-3 of sub-switch 102-2 that is directly connected to the sub-switch 102-3 may not have associated available storage space (the deadlockable storage space associated with the internal input port 114-3 of the sub-switch 102-2 and the storage partition 120-3 associated with the internal input port 114-3 and the external output port 106-3 of the sub-switch 102-2 may be fully occupied). In such a scenario, the switch controller 104 may alternatively route the packet from sub-switch 102-3 through internal output port 112-3 to an internal input port 114-1 of sub-switch 102-4, wherein the packet temporarily received and stored in the deadlockable storage space associated with the internal input port 114-1 of sub-switch 102-4 until it is routed through internal output port 112-2 to the internal input port 114-2 of sub-switch 102-2, wherein the internal input port 114-2 of sub-switch 102-2 has available space in deadlockable storage 116-2 for storing the packet until it may be routed through the external output port 106-3 of sub-switch 102-2. In circumstances where the deadlockable storage 116-2 of sub-switch 102-2 may be completely consumed by other packets being stored, the packet may be stored in a storage partition 120-3 associated with the internal input port 114-2 and reserved for the external output port 106-3 of sub-switch 102-2.

In implementations where visibility may not exist between the internal output port 112-3 of sub-switch 102-3 and the internal input port 114-2 of sub-switch 102-2 (there is no direct connection between such ports and switch controller 104 is distributed amongst the different sub-switches 102) the possibility exists that the packet may be sent to the internal input port 114-2 of the sub-switch 102-2 via the third intervening sub-switch 102-4 without the internal input port 114-2 having associated packet storage space available. However, the storage partition 120-3 allocated to the internal input port 114-2 of the sub-switch 102-2 and designated for the external output port 106-3 of the sub-switch 102-2 facilitates forward progress of the packet at external output port 106-3 of sub-switch 102-2. Thus, deadlocks are reduced or avoided. At the same time, such a reduction in the potential for deadlocks does not require the over provisioning of bandwidth, wherein each sub-switch is directly connected to more than one internal input port of each of the other sub-switches of the switching device.

Figure 3:
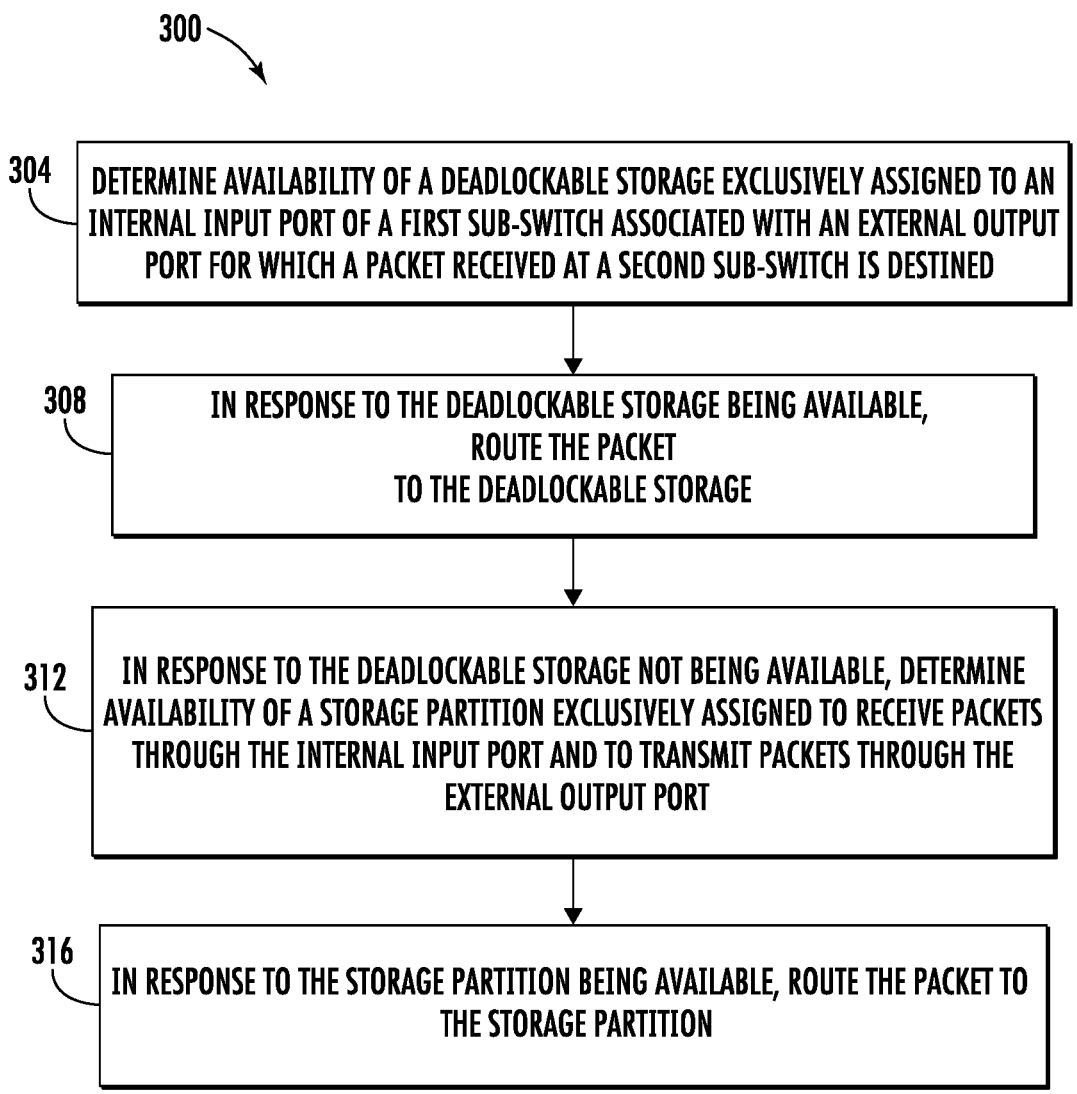
FIG. 3 is a flow diagram of an example hierarchical switching device method.

FIG. 3 is a flow diagram of an example hierarchical switching device method 300. Hierarchical switching device method 300 reduces the occurrence of deadlocks or port-to-port dependencies without the over provisioning of bandwidth in the hierarchical switching device. Method 300 utilizes sub-switches having deadlockable storage and storage partitions for each sub-switch internal input port to provide high performance and efficient use of storage capacity with less complexity. Although method 300 is described in the context of being carried out using hierarchical switching device 100 described above, it should be appreciated that method 300 may likewise be carried out with other hierarchical switching devices.

As indicated by block 304, after receiving a packet at an external input port 110 and determining an external output port 106 to which the packet should be routed through the device 100, the switch controller 104 determines the availability of a particular deadlockable storage 116, exclusively assigned to an internal input port 112 of a first sub-switch 102 associated with the external output port 106 for which a packet received at a second sub-switch 102 is destined.

As indicated by block 308, in response to a deadlockable storage 116 of the sub-switch 102 being available, having storage space, switch controller 104 routes the packet to the particular deadlockable storage.

As indicated by block 312, in response to the deadlockable storage not being available, not having sufficient space available for storing the packet, switch controller 104 then determines whether the storage partition exclusively assigned to receive packets through the internal input port (the internal input port directly connected to the second sub-switch) and to transmit packets through the external output port 106 has space available to store the packet.

As indicated by block 316, in response to the storage partition being available, switch controller 104 routes the packet to the storage partition. If the storage partition is not available, the switch controller 104 evaluates routing the packet to the external output port using intervening sub-switches as described in the above example with respect to FIG. 2.

Figure 4:
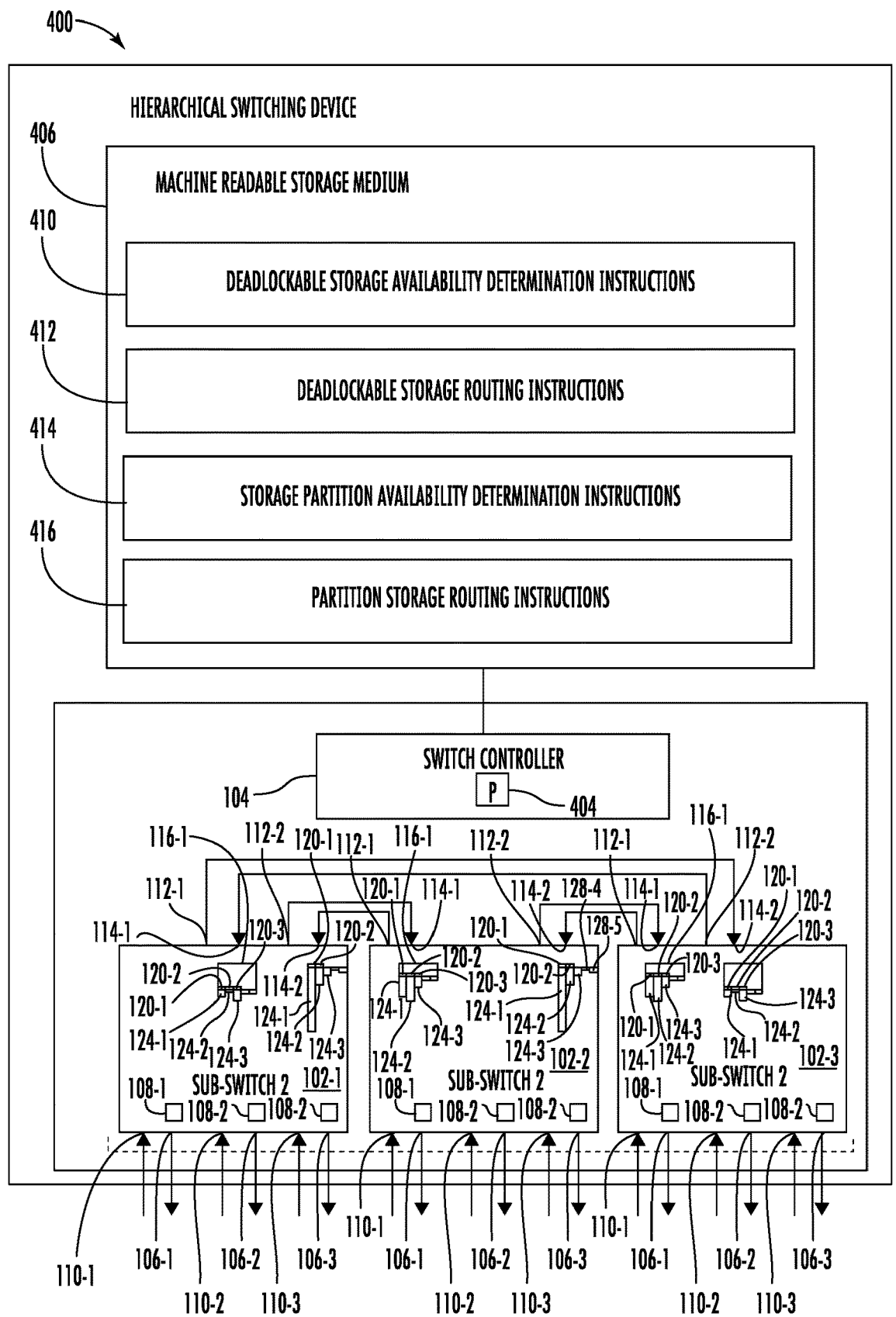
FIG. 4 is a diagram schematically illustrating portions of an example hierarchical switching device.

FIG. 4 is a schematic diagram of an example hierarchical switching device 400. Hierarchical switching device 400 is similar to hierarchical switching device 100 described above except that hierarchical switching device 400 is illustrated as having a fewer number of sub-switches, three sub-switches. Those components of hierarchical switching device 400 which correspond to components of hierarchical switching device 100 are numbered similarly. As shown by FIG. 4, switch controller 104 comprises a processor 404 and non-transitory computer-readable medium or machine-readable storage medium 406. The storage medium 406 contains instructions for directing the processor 404 of switch controller 104 to carry out various operations. In one implementation, the machine-readable storage medium 406 may include instructions causing the switch controller 104 to allocate storage space of a buffer or buffers amongst the various deadlockable storage is 116 and storage partitions 120. As shown by FIG. 4, the machine-readable storage medium 406 may further include instructions for routing packets through hierarchical switching device 400. The way in which the packets are routed through hierarchical switching device 400 and the architecture of hierarchical switching device 400 reduces the occurrence of deadlocks or port-to-port dependencies without the over provisioning of bandwidth in the hierarchical switching device. Switching device 400 utilizes sub-switches having deadlockable storage and storage partitions for each sub-switch internal input port to provide high performance and efficient use of storage capacity with less complexity.

As schematically illustrated by FIG. 4, the machine-readable storage medium 406 comprises deadlockable storage availability determination instructions 410, deadlockable storage routings instructions 412, storage partition availability determination instructions 414 and partition storage routing instructions 416. The deadlockable storage availability determination instructions 416 direct the processor of switch controller 104 to determine availability of a deadlockable storage exclusively assigned to an internal input port of first a sub-switch associated with an external output port for which a packet received at a second sub-switch is destined. The deadlockable storage routing instructions 412 direct the processor of switch controller 104 to route the packet to the deadlockable storage in response to the deadlockable storage being available. The storage partition availability determination instructions 414 are triggered in response to the deadlockable storage not being available. The storage partition availability determination instructions 414 direct the processor to determine availability of a storage partition exclusively assigned to receive packets through the internal input port and to transmit packets through the external output port. The partition storage routing instructions 416 direct the processor to route the packet to the storage partition in response to the storage partition being available.

The hierarchical switching device 400 offer several advantages. For example, the storage partitions have an overall size across all sub-switches (I*O*M) that is a product of the sum of external and internal inputs(I), the sum of external and internal output(O) and the size of the largest packet allowed (M). The deadlockable storage has an overall size across all sub-switches (I*L) that is a product of the sum of external and internal inputs (I) and the sum of the number of packets received at a maximum anticipated rate (L). As L is typically much larger than M, the sum I*O*M+I*L is much less than I*O*L*O which would otherwise be required to be performant. In addition, the internal bandwidth ($BW_{int}$) equivalent to twice the external bandwidth ($BM_{int}>=2*BW_{ext}$) is sufficient to be performant over general traffic patterns in contrast to hierarchical switches having S sub-switches that only communicate directly and which require an internal bandwidth $BW_{int}>=S*BW_{ext}$ to be performant over general traffic patterns.

Although the present disclosure has been described with reference to example implementations, workers skilled in the art will recognize that changes may be made in form and detail without departing from the spirit and scope of the claimed subject matter. For example, although different example implementations may have been described as including features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A hierarchical switching device comprising:
a plurality of sub-switches forming a fully interconnected all-to-all network within the hierarchical switching device, wherein a respective sub-switch comprises external output ports, internal input ports, and internal output ports, and wherein the plurality of sub-switches—exchange packets via respective internal input and output ports within the hierarchical switching device using the fully interconnected all-to-all network;
a deadlockable storage in a first sub-switch of the plurality of sub-switches, wherein the deadlockable storage is exclusively assigned to store a packet received at a first internal input port of the first sub-switch independent of to which of the output ports of the first sub-switch the packet is destined;
a storage partition exclusively assigned to store a packet destined to a first external output port of the first sub-switch and received at the first internal input port; and
a switch controller to:
determine that a first packet is destined for the first external output port of the first sub-switch;
in response to the deadlockable storage having available capacity, route the first packet through the first internal input port to the deadlockable storage; and
in response to the deadlockable storage not having available capacity, route the first packet to the storage partition.

2. The hierarchical switching device of claim 1, wherein the deadlockable storage is shared amongst the external output ports of the first sub-switch.

3. The hierarchical switching device of claim 1, comprising a second storage partition associated with a second external output port of the first sub-switch and exclusively assigned to the first internal input port.

4. The hierarchical switching device of claim 1, wherein the deadlockable storage is to queue packets designated for any of the external output ports of the first sub-switch or any of the internal output ports of the first sub-switch.

5. The hierarchical switching device of claim 1, wherein the hierarchical switching device is to accommodate a maximum packet size supported by the hierarchical switching device, and wherein the storage partition has a size corresponding to the maximum packet size.

6. The hierarchical switching device of claim 1, wherein a size of the deadlockable storage corresponds to a number of packets received at a maximum anticipated rate of transmission of packets to the first sub-switch for a period extending from when a packet is sent by the first sub-switch to when a credit for the sent packet is received by the first sub-switch.

7. The hierarchical switching device of claim 1, wherein the switch controller is further to:
determine availability of the storage partition for storing the first packet in response to the deadlockable storage not having available capacity; and
route the first packet to the storage partition in response to the storage partition being available.

8. A method, comprising:
receiving a first packet at a hierarchical switching device comprising a plurality of sub-switches forming a fully interconnected all-to-all network within the hierarchical switching device, wherein a respective sub-switch comprises external output ports, internal input ports, and internal output ports, and wherein the plurality of sub-switches exchange packets via respective internal input and output ports within the hierarchical switching device using the fully interconnected all-to-all network;
determining availability of a deadlockable storage in a first sub-switch of the plurality of sub-switches, wherein the deadlockable storage is exclusively assigned to store a packet received at a first internal input port of the first sub-switch independent of to which of the output ports of the first sub-switch the packet is destined;
determining that the first packet is destined for a first external output port of the first sub-switch;
in response to the deadlockable storage having available capacity, routing the first packet through the first internal input port to the deadlockable storage; and
in response to the deadlockable storage not having available capacity, routing the first packet to a storage partition of the first sub-switch exclusively assigned to store a packet received at the first internal input port and destined to the first external output port.

9. The method of claim 8 further comprising:
queuing the first packet received by a second sub-switch in a second deadlockable storage of the second sub-switch;
routing the first packet from the second deadlockable storage via an internal output port of the second sub-switch to an internal input port of a third sub-switch;
queuing the first packet received by the third sub-switch via the internal input port of the third sub-switch in a third deadlockable storage of the third sub-switch; and
routing the first packet from the third deadlockable storage via an internal output port of the third sub-switch to the first internal input port of the first sub-switch.

10. The method of claim 8, wherein the deadlockable storage is shared amongst the external output ports of the first sub-switch.

11. The method of claim 8, wherein the first sub-switch comprises a second storage partition associated with a second external output port of the first sub-switch and exclusively assigned to store a packet received at the first internal input port and destined to the second external output port.

12. The method of claim 8, wherein the deadlockable storage is to queue packets designated for any of the external output ports of the first sub-switch or any of the internal output ports of the first sub-switch.

13. The method of claim 8, wherein the hierarchical switching device is to accommodate a maximum packet size supported by the hierarchical switching device, and wherein the storage partition has a size corresponding to the maximum packet size.

14. The method of claim 8, wherein a size of the storage partition corresponds to a number of packets received at a maximum anticipated rate of transmission of packets to the first sub-switch for a period extending from when a packet is sent by the first sub-switch to when a credit for the sent packet is received by the first sub-switch.

15. The method of claim 8, further comprising:
determining availability of the storage partition for storing the first packet in response to the deadlockable storage not having available capacity; and
routing the first packet to the storage partition in response to the storage partition being available.

16. A switch controller for a hierarchical switching device, the switch controller comprising a non-transitory computer-readable medium comprising a plurality of instructions that, in response to being executed by a processor, cause the switch controller to:
determine that a first packet is received at a hierarchical switching device comprising a plurality of sub-switches forming a fully interconnected all-to-all network within the hierarchical switching device, wherein a respective sub-switch comprises external output ports, internal input ports, and internal output ports, and wherein the plurality of sub-switches exchange packets via respective internal input and output ports within the hierarchical switching device using the fully interconnected all-to-all network;
determine availability of a deadlockable storage in a first sub-switch of the plurality of sub-switches, wherein the deadlockable storage is exclusively assigned to store a packet received at a first internal input port of the first sub-switch independent of to which of the output ports of the first sub-switch the packet is destined;
determine that the first packet is destined for a first external output port of the first sub-switch;
in response to the deadlockable storage having available capacity, route the first packet through the first internal input port to the deadlockable storage;
in response to the deadlockable storage not having available capacity, route the first packet to a storage partition of the first sub-switch exclusively assigned to store a packet received at the first internal input port and destined to the first external output port.

17. The switch controller of claim 16, wherein the plurality of instructions that, in response to being executed by the processor, cause the switch controller further to:
queue the first packet received by a second sub-switch in a second deadlockable storage of the second sub-switch;
route the first packet from the second deadlockable storage via an internal output port of the second sub-switch to an internal input port of a third sub-switch;
queue the first packet received by the third sub-switch via the internal input port of the third sub-switch in a third deadlockable storage of the third sub-switch; and
route the first packet from the third deadlockable storage via an internal output port of the third sub-switch to the first internal input port of the first sub-switch.

18. The switch controller of claim 16, wherein the hierarchical switching device is to accommodate a maximum packet size supported by the hierarchical switching device, and wherein the storage partition has a size corresponding to corresponding to the maximum packet size.

19. The switch controller of claim 16, wherein a size of the storage partition corresponds to a number of packets received at a maximum anticipated rate of transmission of packets to the first sub-switch for a period extending from when a packet is sent by the first sub-switch to when a credit for the sent packet is received by the first sub-switch.

20. The switch controller of claim 16, wherein the plurality of instructions that, in response to being executed by the processor, cause the switch controller further to:
determine availability of the storage partition for storing the first packet in response to the deadlockable storage not having available capacity; and
route the first packet to the storage partition in response to the storage partition being available.

\* \* \* \* \*